US005650063A

United States Patent [19]
Yan

[11] Patent Number: 5,650,063
[45] Date of Patent: Jul. 22, 1997

[54] REMOVAL OF ACIDIC HALIDES FROM HOT GAS STREAMS AND ATTRITION REGENERATION OF CAUSTIC

[75] Inventor: Tsoung Y. Yan, Wayne, Pa.

[73] Assignee: Mobil Oil Corporation, Fairfax, Va.

[21] Appl. No.: 367,499

[22] Filed: Dec. 30, 1994

[51] Int. Cl.⁶ .................................................... C07C 7/12
[52] U.S. Cl. ...................... 208/305; 208/262.1; 208/284; 208/287; 95/132
[58] Field of Search ..................................... 208/305, 308, 208/203, 262.1, 283, 284, 286, 287, 299, 302; 210/807, 902; 201/29; 95/131, 132, 141, 142; 34/DIG. 1, 300, 333; 585/854

[56] References Cited

U.S. PATENT DOCUMENTS

| | | | |
|---|---|---|---|
| 3,060,117 | 10/1962 | Payne | 208/305 |
| 3,761,534 | 9/1973 | Sun et al. | 208/288 |
| 4,123,351 | 10/1978 | Chapman et al. | 585/854 |
| 4,167,531 | 9/1979 | Potts | 585/854 |
| 4,938,936 | 7/1990 | Yan | 585/85 |

Primary Examiner—Glenn A. Caldarola
Attorney, Agent, or Firm—Malcolm D. Keen; Thomas W. Steinberg

[57] ABSTRACT

Acidic halides, especially chlorides, are removed from a dry fluid stream by contact with dry particles of solid caustic. The solid caustic particles are preferably non-porous, and disposed as a fluidized bed. Salts deposit on the surface of the caustic and are physically removed, preferably by attrition, to regenerate the surface of the solid caustic. An dry, slightly alkaline salt can be the only product of neutralization. Salt coated beds of solid caustic can also be regenerated for reuse by attrition removal of salt deposits.

15 Claims, 1 Drawing Sheet

FIGURE
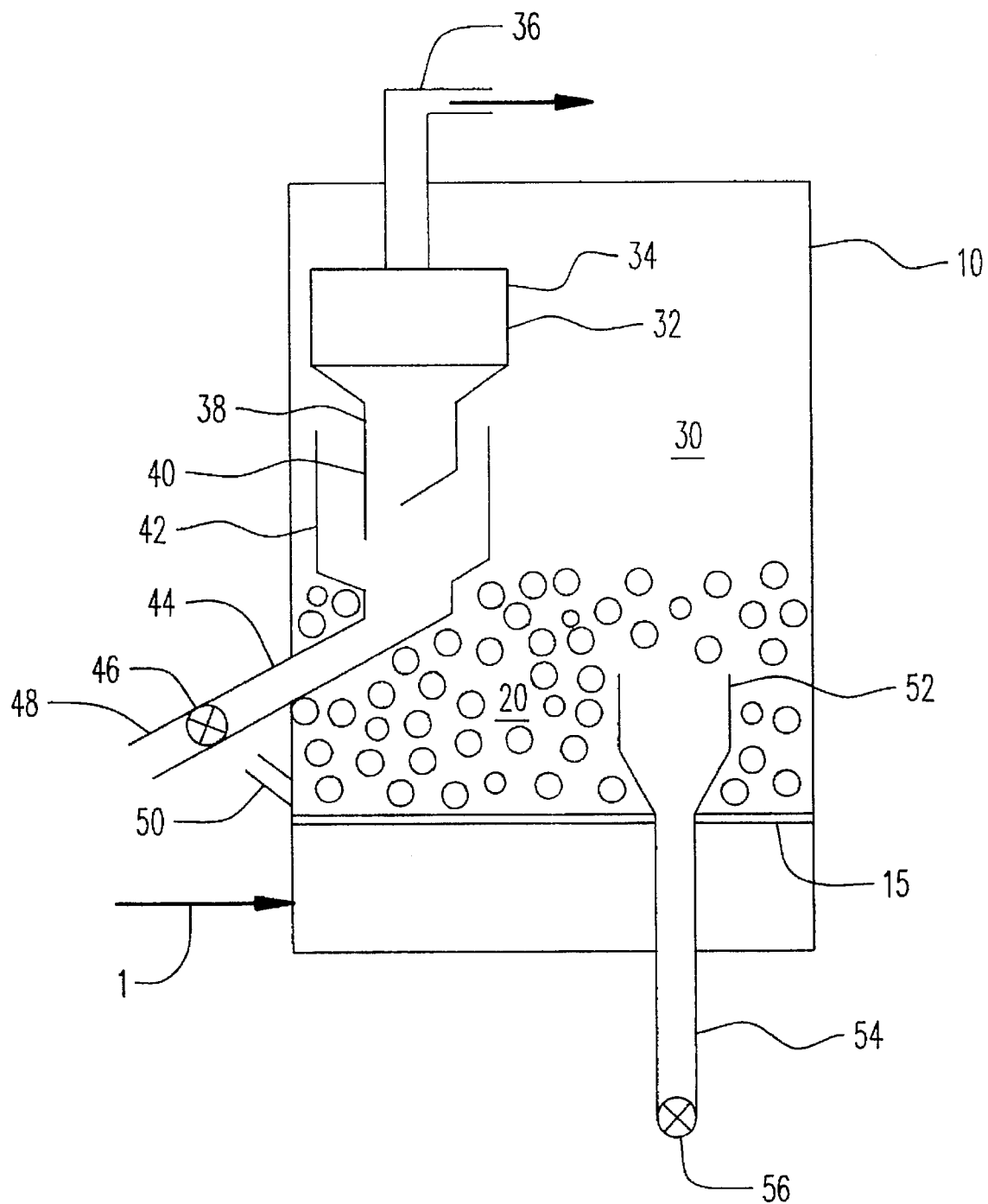

5,650,063

REMOVAL OF ACIDIC HALIDES FROM HOT GAS STREAMS AND ATTRITION REGENERATION OF CAUSTIC

CROSS-REFERENCE TO RELATED APPLICATIONS

This application is related to my prior co-pending application Ser. No. 08/217,821 filed on Mar. 25, 1994.

FIELD OF THE INVENTION

This invention relates to removal of halides, especially chlorides, from gas streams, especially gases which are too hot for wet scrubbing, and for regeneration of solid caustic used to remove acidic halides from vapor and liquid streams.

BACKGROUND OF THE INVENTION

Removal of acidic components from smelters, power plants, refineries, and petrochemical plants has been a pervasive problem for decades.

While a variety of wet scrubbing techniques have been tried to remove acidic sulfur and halide compounds from vapors and liquids, such processes are difficult. Wet scrubbing is effective, but requires that the gas being treated be cool enough to support a liquid phase, and the flue gas from such a process makes a very visible plume when discharged to the atmosphere. Although the white plume is simply condensed water vapor, it is very visible and somewhat objectionable to some members of the community.

Many process streams also do not lend themselves to wet scrubbing processes, in that the streams are parts of processes which require a dry atmosphere. Wet scrubbing removes, e.g., chlorides, but can add so much water that other parts of the process would be troubled. Leaving the acidic components in a process stream unfortunately also causes problems, as can be seen from a review of the problems of chlorides in reformate which follows below.

Catalytic reforming, using Pt based reforming catalyst, is one of the most important refinery processes in the world. Most refineries have a catalytic reformer, which converts naphtha fractions into high octane reformate.

Reformers come in many types and sizes—from 2000 BPD fixed bed units to moving or swing bed units processing more than 50,000 BPD. Reformers are available with fixed bed reactors, swing bed reactors, or moving bed reactors. Many new units are moving bed reactors, available from UOP, Inc, Des Plaines, Ill.

Reformers generally use mono-metallic catalysts (Pt on a support such as alumina) or bi-metallic catalyst (Pt—Re on a support). Other combinations of Pt and other metals are known.

All reforming catalysts are believed to contain halide, almost invariably chlorine. Chlorine is now ubiquitous in catalytic reforming. Chloroplatinic acid may be used in the impregnation solution forming the catalyst. Some refiners may add chlorine compounds during normal operation.

One major oil company developed a Pt reforming catalyst regeneration or "rejuvenation" procedure which conducted at least some portions of the regeneration in the presence of one or more chlorine compounds. The procedure was believed originally developed for swing reactor systems which were regenerated every day or so, but this regeneration method, or some variant of it, was eventually used in semi-regenerative reformers and in moving bed reformers.

All of this chlorine can, and does, find its way into gas and liquid products from the reformer. Based on a review of several decades of The Oil and Gas Journal, the key to successful catalytic reforming is lots of chloride. For decades refiners have talked about the problems of getting enough chlorides into the system, and dealing with the chlorides in the vapor and liquid products from the reformer.

In 1977 there was talk of the need for heat, chloride and moisture to redistribute platinum.

In 1980 there was a discussion of deposits of ammonium chloride in catalytic reforming compressor internals.

In 1985 there was discussion of the need for, and difficulty of maintaining, 1.0 wt % chloride on bimetallic catalyst between regenerations. It was suggested to "come out on the high side on chloride."

In *Alumina adsorbents effectively remove $HC_1$ from reformer $H_2$ gas stream*, Janke et al, Oil and Gas Journal, May 12, 1986, page 64, talked about controlled injection of organic chloride at the reformer reactor inlet, and the mischief caused by all this chloride. The problem was worse with continuous catalytic reforming processes, which were reported "to require higher levels of chloride addition for regeneration...." The solution proposed was use of alumina adsorbents to remove the $HC_1$ from the net off gas. This article is incorporated by reference.

In Apr. 1, 1994 there was a discussion of corrosion in fired heaters due to chloride in the hydrogen from the reforming unit. The proposed solution was alumina treaters.

The problem is not limited to reformers. Similar problems occur in some isomerization units, and may occur in other units which are relatively dry and use a chloride containing catalyst.

The conditions which lead to chloride problems are catalysts which contain, or reaction conditions which require, chlorine compounds, and reactants which are dry enough that no separate aqueous phase forms in the vapor/liquid separator downstream of the reactor. Essentially all Pt reformers meet these conditions, and many isomerization and other processing units meet these conditions.

The situation could be summarized as follows for Pt reformers. Although refiners may use different reforming catalysts, all the catalysts seem to contain chlorine. There is enough chlorine either present in the virgin catalyst, or from chlorine addition during reformer operation, or from chlorine added during the catalyst regeneration, so that chlorine compounds appear in all the product streams coming from the reformer. Both vapor and liquid products have chlorine compounds.

The raw liquid reformate has chlorides. The net hydrogen gas make has chlorine compounds. When the raw reformate is fractionated, usually in a debutanizer, the overhead vapor fraction contains chlorine compounds.

While chlorides in liquid reformate are a serious problem, the present invention is not directed to solving that problem. Instead, the present invention focusses on removal of chlorides or other acidic halides present in dry gas streams such as gas streams from a reformer. Of primary concern is removal of chlorides from the net gas make from the reformer vapor liquid separator, the hydrogen rich gas removed from the reformer for use in other refinery processes, and the flue gas from any catalyst regeneration/chlorination facility which may be present.

In reforming units with recontacting drums for recycle gas, it would help if some means were available to remove chlorides from recycle gas. There is an equilibrium between chlorides in reformate and chlorides in the gas phase, and removing chlorides from recycle gas would reduce the amount of chlorides in the liquid reformate as well as reduce chlorides in the net recycle gas make of the unit.

Another concern is removal of chlorides from vapor streams generated by downstream processing of raw reformate, e.g., removing chlorides from overhead separator vapor associated with reformate fractionators.

It would be beneficial if a process were available which could remove chlorides and the like from flowing process streams in a completely dry process, not involving the presence of any aqueous phase.

Those skilled in the treating arts know that some reaction of acidic halides in liquid hydrocarbons can occur with solid caustic, always accompanied by formation of salt, and usually in the presence of significant amounts of dissolved water.

A bed of granular alkalies was used to treat a variety of liquid hydrocarbon streams in Sun U.S. Pat. No. 3,761,534, which is incorporated by reference.

Example 1 used 4–8 mesh granular NaOH to remove sulfuric acid from an alkylate stream of tert.-butylated ethyl-benzene containing about 0.3N total acid, primarily sulfuric acid. Although efficient acid removal first occurred, the bed plugged before 100 volumes of alkylate could flow through the bed.

Example 4 used no NaOH, but treated an effluent from the alkylation of benzene with ethylene in the presence of HCl with soda lime and glassmaker's (G.M.) alkali to remove acid.

Example 5 used pellets of C. P. NaOH to treat crude tert. butylated ethyl-benzene containing 570 ppm $H_2SO_4$. NaOH pellets plugged at 92 weights of alkylate per weight of alkali, while beds of soda lime and G. M. alkali did not plug.

Example 7 used G. M. alkali on a support grid to treat crude tert.butylated ethylbenzene containing about 600 ppm sulfuric acid. The organic flowed up through the support grid, through the alkali to an outlet above the bed of alkali. A white precipitate built up in the reservoir below the grid, which was periodically removed through a drain valve by a water purge. The bed of alkali was reported essentially unchanged by casual observation and there was no increase in resistance to flow through it.

The streams treated in '534 were probably saturated with water, as periodic water purges were reported in many examples, and salts seemed to collect as solid deposits in a sump under the bed of alkaline solid. Some of the results reported could be summarized as follows:

Beds of caustic pellets do not work for very long to remove acidic contaminants from liquid hydrocarbon streams.

All beds plug in downflow operation or rapidly lost effectiveness. Upflow operation with alkali on a support of a grid or coarse screen works a long time because salts that form can fall down through the screen.

Porous G.M. alkali was better than solid caustic.

There is a need for a process that can treat bone dry gas streams at a temperature so high that no aqueous phase could be maintained. If such streams could be treated with solid caustic in a way which produced very little in the way of waste streams or byproducts, it would be a great advance in the art.

I discovered a way to treat such gas streams. Chlorides in hot, bone dry gas could be efficiently converted to salt. I also developed a solid caustic regeneration procedure, which allowed the salt to be removed as a dry powder from the solid caustic particles, permitting reuse of the remaining caustic and recovery of a low volume, almost neutral salt as the only product of the neutralization reaction. This regeneration procedure could be used to continuously regenerate caustic used in a hot, dry gas treating process. This regeneration technique could also be used to regenerate salt contaminated particles of solid caustic from other sources, so long as the salt had been deposited on the solid caustic in a dry atmosphere.

BRIEF SUMMARY OF THE INVENTION

Accordingly, the present invention provides a process for a process for removing acidic halides from a gas stream comprising: charging a gas containing less than about 2000 ppmv $H_2O$ and from 1 to 4000 wt ppm acidic halide to a reactor; neutralizing said acid halides in said dry gas by contact and neutralization with particles of solid caustic containing at least a majority by weight solid caustic to produce salt; depositing at least a majority of said produced salt on said particles of solid caustic as dry salt crystals; removing from said reactor a dry gas having a reduced acidic halide content as a product of the process and at least periodically removing said deposited salt from said solid caustic by attrition, abrasion, or other physical salt removal methods which remove at least a majority of said salt deposits while leaving intact at least a majority by weight of said particle of solid caustic.

In another embodiment, the present invention provides a process for removing chlorides from gas streams from a catalytic reformer comprising: charging a dry gas stream containing less than about 1000 ppmv $H_2O$ and from 1 to 2000 wt ppm chlorides from a platinum reformer to a neutralization reactor; neutralizing said chlorides in said dry gas by contact with particles of solid, essentially nonporous, caustic to produce salt; depositing at least 75% of said produced salt on a surface of said solid caustic as dry salt crystals; removing from said reactor a dry gas having a reduced acidic halide content as a product of the process; and regenerating said surface of said solid caustic by fluidizing said bed in an amount sufficient to cause particle to particle contact and attrit deposited salt from said solid caustic particles.

In another embodiment, the present invention provides a method of regenerating the surface of a salt contaminated solid caustic particles used to remove acidic halides from an aqueous phase free fluid comprising: fluidizing a bed of salt contaminated solid caustic particles in a flowing stream of fluid which is essentially free of any aqueous phase; and removing at least a majority of said salt contamination by attrition via particle to particle contact in said solid bed to attrit a majority of said salt from said surface of said solid caustic while maintaining the physical integrity of said solid caustic particles to produce particles with a reduced salt contaminant content as a product of the process.

In another embodiment, the present invention provides a method of regenerating the surface of a salt contaminated solid caustic particles used to remove acidic halides from an aqueous phase free fluid comprising: fluidizing a bed of salt contaminated solid caustic particles in a flowing stream of fluid which essentially free of any aqueous phase; and removing at least a majority of said salt contamination by attrition via particle to particle contact in said solid bed to attrit a majority of said salt from said surface of said solid caustic while maintaining the physical integrity of said solid caustic particles to produce particles with a reduced salt contaminant content as a product of the process.

In yet another embodiment, the present invention provides a process for removing acidic halides from a gas stream at a temperature above the boiling point of water at the pressure of said gas stream comprising: charging said gas containing acidic halide to a reactor; neutralizing said acidic halides in said dry gas by contact and neutralization with particles of solid caustic containing at least a majority by weight solid caustic to produce salt; depositing at least a majority of said produced salt on said particles of solid caustic as dry salt crystals; removing from said reactor a dry gas having a reduced acidic halide content as a product of the process and at least periodically removing said deposited salt from said solid caustic by attrition, abrasion, or other physical salt removal methods which remove at least a majority of said salt deposits while leaving intact at least a majority by weight of said particle of solid caustic.

BRIEF DESCRIPTION OF THE DRAWINGS

The FIGURE is a simplified schematic view of a preferred solid caustic reactor/regenerator which can be used for treatment of hot, dry gas streams or for regeneration of salt contaminated solid caustic.

DETAILED DESCRIPTION OF PREFERRED EMBODIMENTS

The invention can be better understood in conjunction with a review of the FIGURE which shows one embodiment of the present invention which can be used to dehalogenate hot, bone dry gas streams or merely to regenerate salt contaminated solid particles of caustic which have been used in some other process.

Basically reactor 10 holds a large fluidized bed 20 of solid caustic. The process works well with large beads of solid caustic, so for ease of handling and to make it easier to design the caustic bed it usually will be preferred to use large beads of solid caustic or other solid alkaline material.

Gas from line 1 is added to a lower portion of the device and passes through support means or screen 15 into the lower portion of bed 20. The bed may also simply occupy the entire lower portion of vessel 10, with no support of any kind. In this case, it may be beneficial to provide pipe grid distributors or other gas distribution means in lower portions of the bed to promote even distribution of gas.

Hot dry gas passes through the fluidized bed into dilute phase region 30. The gas will usually contain fine salt particles which were deposited on, and then attrited from, the much larger solid caustic particles in the fluidized bed 20. The vapor with entrained salt deposits enters horn 32 of cyclone 34. A vapor with a greatly reduced salt content is removed via vapor outlet 36 while fine particles of salt are discharged down via dipleg 38 through flapper valve 40 into funnel outlet means 42. Salt is removed via line 44 and lock hopper valve 46 and discharged via line 48 for disposal or for use in other processes not shown.

Fresh particles of solid caustic may be admitted via line 50, and particles of solid caustic may also be withdrawn periodically or continuously via funnel outlet 52, line 54 and lock hopper valve means 56.

Caustic beads or other mechanically strong form of solid caustic with a shape leading to a large void volume in the reactor may safely be used for dry bed operation. Soft forms can also be used, but there will be unnecessarily high caustic attrition losses via line 36, which might increase dust emissions and/or produce an alkaline salt product in line 48.

More details will now be provided about each part of the process.

GAS STREAM WITH ACIDIC COMPONENTS

The process can be used with any non-water saturated gas stream containing acidic halide compounds which can react with solid caustic.

The gas stream can be mostly hydrocarbon vapors and hydrogen, or inert, or an oxidizing atmosphere such as air or flue gas with minor amounts of air.

Details on some of the types of acidic halides present in refinery streams, and the salts they form, are disclosed in *Calculations estimate process stream depositions,* Oil & Gas Journal, Jan. 3, 1994 pp 38–41, Yiing-Mei Wu. This article is incorporated by reference. It is cited to provide details on some of the many chemical species which exist in refinery and petrochemical streams.

Among the most ubiquitous halides are the chlorides, which are discussed extensively in the OGJ article above, and which cause so much mischief in refineries, and especially around and downstream of reformers. The discussion that follows will therefore focus on chlorides and reformer streams.

The process is especially useful for treating reformer recycle gas, reformer off gas, and gas streams associated with reformer fractionators such as the off gas from the reformer debutanizer overhead receiver and for hot dry flue gas containing halides.

The gas stream must be dry, that is have a low relative humidity. The humidity must be low enough, or low enough relative to chloride content of the gas, so that no aqueous liquid phase forms on the caustic. Preferably the relative humidity is lower than 10%, preferably lower than 5%, and most preferably 1% or less. In absolute terms, the moisture content of the gas should be below 3000 volume ppm water, and preferably is less than 1500, and most preferably is below 300 ppm. The process works well when the gas stream contains less than 100 volume ppm water.

At high moisture levels the bed can fuse or plug. In addition to the native water in the gas, the neutralization reaction can form more water, and water from any source can lead to bed plugging. In general the process tolerates more chloride when the native water content of the gas to be treated is low.

Surprisingly, the process works well with bone dry gas streams, such as those having less than 20 ppm volume water, or less than 10 ppmv water, and even less than 5 ppmv water. I have successfully removed chlorides with a dry bed of solid caustic even with gas streams having 1.8 ppmv water.

The gas stream may, and frequently will, have significant amounts of entrained liquid hydrocarbon. The process tolerates large amounts of liquid hydrocarbons. These do not seem to adversely affect the bed of solid caustic. The liquid hydrocarbons will greatly complicate the design of the fluidized bed, much as the fluidization characteristics of a dry bed of sand are much different than those of a bed of quicksand.

In practice, most reformer gas streams will be dry enough to treat with my dry bed process. Thus reformer net recycle gas make or recycle gas, and reformer debutanizer overhead receiver vapor will usually be capable of being treated efficiently using a completely dry bed.

Chloride (or other acidic halide) content may vary greatly. The incoming gas preferably has a chloride content below about 5000 ppm, and more preferably below 2500 ppm HCl, and most preferably below 500 ppm. If the chloride contents are much above this level, the inlet to the bed can plug due to the deposition of copious amounts of NaCl crystals near the inlet and perhaps wet the bed due to water of neutralization.

The process works well to remove chlorides when the feed has several hundred ppm Cl, or even less than 50 ppm Cl. Significant chloride removal can be achieved when the gas stream contains only 5 or 6 ppm chloride.

The above guidelines on maximum halide and water contents are primarily directed at continuous operation and when the process is used in a continuous treater, using attrition to continuously remove salt deposits as they form. The process tolerates well relatively short "spikes" of either water or halides or both, preferably of no more than about 1 hour duration.

The process can tolerate much higher humidity levels if the temperatures are higher, e.g. a high temperature flue gas stream can have a lot of water vapor in it, but still have a temperature high enough so that no water phase will form.

An upper limit on temperature is set by the melting or fusing or softening point of the alkaline material used. The solid caustics preferred for use herein could not, for example, be used in a circulating fluid bed combustor, because the temperatures are too high and the solid caustic would melt. This can be understood by considering the properties of the preferred alkaline reagent for use herein, essentially pure NaOH.

SODIUM HYDROXIDE

Because sodium hydroxide is the preferred reagent for use herein, some more information about it is provided below, taken primarily from Kirk_Othmer, Alkali and Chlorine Products.

Pure, anhydrous sodium hydroxide (NaOH or caustic soda) is a white, slightly translucent crystalline solid. Although made in the form of a solid, flakes or beads, it is almost never used in the solid form. As stated therein ". . . it is used almost exclusively in water solutions . . . ."

Caustic has a melting point of 318° C., and a density of 2.13 g/cc.

It is highly corrosive to skin, in aqueous solutions even in moderate concentrations. Caustic is used in most refineries in this most dangerous form, as a liquid. Although it can be handled with safety if proper precautions are taken, it is much easier and safer to work with dry solid caustic (I prefer beads) than an aqueous solution of caustic.

BED FLUIDIZATION REGIME

As a general guideline, the threshold amount of fluidization for attrition regeneration is movement. Thus mechanical agitation of a fixed or expanded bed, or use of a moving bed reactor designed to reject fines and dust, will provide enough particle to particle contact to cause some attrition and remove the net salt deposition.

Preferably, the bed is at least ebullating fluidized bed, more preferably a bubbling fluidized dense bed. Turbulent and fast fluidized beds may also be used. In general it will be best to limit the vapor velocity so that only limited amounts of dilute phase transport of caustic solids occur. Dilute phase transport provides little particle to particle contact, and much of the attrition that occurs is at the expense of the equipment.

Although continuous bed fluidization is preferred, it is also possible to fluidize the bed only intermittently. Thus the bed could operate for a day or a week or any predetermined period until enough salt had deposited to make bed regeneration worthwhile. The unit could continue in service, with an increased air flow rate from recycle of flue gas, and attrition could remove accumulated salt deposits.

Other possibilities include attrition regeneration of the caustic particles at a remote site. This would involve periodic removal of solid caustic particles via line 54, fluidization regeneration in a fluidized bed remote from reactor 10, and periodic return of solid caustic particles via line 50. A somewhat related procedure would be removal of solid caustic particles and use of brushes or high velocity vapor streams to remove salt deposits from solid caustic.

A completely vapor phase regeneration is preferred, it is also possible to use a non-aqueous liquid phase regeneration. In this embodiment, a liquid hydrocarbon solvent would be added to the bed even while gas addition continued. The mere addition of liquid hydrocarbon will in many case cause some bed fluidization, much as occurs in the well known expanded bed hydroprocessing reactors. Salt will still be attrited from the large caustic particles, but in this case the salt particles will remain entrained in the hydrocarbon liquid phase. Salt removal can be completed by draining or circulating hydrocarbon liquid from the bed through a filter or centrifuge means to remove salt crystals from liquid hydrocarbon.

To summarize, great flexibility is possible in removing the salt. The salt must be deposited in a non-aqueous system so that it deposits in the form of soft crystals. Such salt deposits may be readily and efficiently removed either continuously or intermittently by attrition in situ in a completely vapor phase system, a hydrocarbon liquid system, or even by periodic removal of solid caustic for mechanical treatment or fluid bed attrition regeneration.

TYPE OF SOLID CAUSTIC

Either beads, pellets, pills, flakes, nuggets or solid caustics may be used. The use of fillers, clay or other inert supports is not helpful and should be avoided.

While use of pure NaOH—technical grade rather than reagent grade—is preferred for low cost, other materials such as glassmakers alkali (a mixture of about 20% Ca(OH)2+80% NaOH), or KOH, soda lime, and like materials may also be used, though not necessarily with equivalent results.

At least a majority, and preferably at least 80%, and more preferably at least 90%, and ideally essentially all of the alkaline solid is NaOH or KOH.

The solid caustic can be used in the form of a high surface area material such as berl saddles, multi-lobed pellets, or the like. It is preferred to use spherical pellets of solid caustic which are non-porous and are easy to fluidize. Preferably the caustic is of uniform size and regular shape. Such properties are beneficial both in salt deposition (by reducing pressure drop through the bed and providing some place for the deposited salt to collect without plugging the bed) and in salt removal (by aiding fluidization). Non-porous caustics are less likely to crumble or collapse than porous materials. Pellets are easy to transport and to fluidize.

The solid caustics used preferably are relatively non-porous. One way to measure porosity is in terms of surface area. The solid caustics used should have a surface area of less than 1 m2/g, and preferably less than 0.5, and most preferably less than 0.1 m2/g.

The inexpensive, technical grade bead caustics commonly available have good properties for use herein. They have the shape of fairly uniform spheres and have an interstitial volume around 30–35%, and a low surface area. I have not measured the surface area, but estimate it at less than 0.1 m2/g.

REACTOR BED DESIGN

Two phases of the process must be considered. The first is salt deposition, the second is salt removal.

In general, a bed depth of at least about 1 foot, and preferably of at least about 3 feet is provided for salt deposition, though there is no lower limit on bed depth for salt removal by attrition.

The salt may be deposited on solid caustic maintained as a single fixed bed, moving bed, multiple fixed beds, or fluidized bed. Salt removal must be by attrition, preferably by particle to particle contact in a fluidized bed. Ideally, the process operates continuously, using a fluidized bed for both salt deposition and attrition/removal.

NEUTRALIZATION REACTION

The neutralization reaction, discussed in more detail below, is straightforward. The chemistry is simple. Simple neutralization reactions are involved which proceed rapidly and completely which makes the process effective. The primary reactions involved are:

$$HCl+NaOH \rightarrow NaCl+H_2O$$

$$NH_4Cl+NaOH \rightarrow NH_3+NaCl+H_2O$$

The salt formed deposits as a fluffy solid upon the solid caustic particles. The water is carried off in the dry gas. A clean gas exits the reactor and is charged to a gas plant, recycled to a reformer or burned as fuel.

The solid caustic may be in the form of pure particles of a suitable caustic material, such as NaOH, KOH, CaO, MgO and the like. NaOH and KOH are preferred, and use of NaOH is most preferred.

This material may be extruded, pilled, prilled, or formed using conventional techniques into any desired shape, preferably one with a high surface area to volume ratio which is mechanically strong and allows free movement of particles.

REACTION CONDITIONS

In terms of space velocity, the GHSV may range from 100 to 500,000 and preferably from 1000 to 10,000 GHSV. The gas superficial velocity may range from 0.01 to 20 ft/sec., preferably from 0.1 to 2 ft/sec.

Temperatures and pressures used are not narrowly critical. In general, the process works well at ambient to elevated temperatures. Typically temperatures may range from ambient to 700° F., with temperatures of 220°–500° F. giving good results.

Pressures may range from subatmospheric to superatmospheric, with pressures of 0 to 3000 psig proving satisfactory. Most refiners will operate at a pressure of 10 to 2000 psig, or at the pressure of the refinery process being considered. Many reformers operate at 50 to 300–500 psig, and my process will operate well at such pressures.

The process of the present invention is most advantageous when the gas stream is at a temperature above that at which a water or brine phase may be maintained at the pressure of the process stream, and below the melting point of the solid caustic. Such streams must otherwise be cooled enough to permit wet scrubbing (at a great cost of energy and usually accompanied by a very visible though non-toxic white plume) or reheated after scrubbing. My process allows these streams to be treated dry.

Caustic is used stoichiometrically, not catalytically. Caustic is continuously consumed and coated with salt and the caustic surface is reactivated by removing the salt.

BED REGENERATION—SALT ATTRITION

An interesting feature of dry bed gas treatment process is that it forms soft, flaky salt deposits on large, non-porous solid caustic particles. Because the salt is essentially all on the surface of the caustic particles, the caustic is "regenerated" by physically removing the salt deposits. This can be done by removing the caustic pellets and removing salt deposits by physical brushing or mild sandblasting.

An efficient salt removal technique is to fluidize the caustic particles and let particle to particle contact attrit soft salt deposits from solid caustic. Bed fluidization could be achieved with either vapor or liquid, though hydrocarbon liquid should be used rather than water, as water would dissolve too much solid caustic.

In terms of cost resources, the process of the present invention is one to two orders of magnitude more effective than alumina treaters. When disposal costs are considered, alumina gas treating can cost from 50 to perhaps 100 times as much as dry caustic bed treating plus attrition regeneration.

The process of the present invention provides an efficient way to convert dilute acidic halide contaminants in flowing process streams into dry, slightly alkaline salt.

The process uses some of the cheapest reagents known (preferably beads of caustic), and produces small amounts of an easy to handle waste (salt, perhaps with a bit of attrited caustic present).

The process provides an ideal way to treat hot, bone dry gas streams containing acidic halides. The caustic bed regeneration process may be used to remove salt from caustic beds used to treat any non-aqueous fluid, such as a dry reformate stream.

While the process can be used on completely dry streams, it generally is not suitable if the streams, whether gas or liquid, used to deposit salt on caustic contain too much water. Liquid streams should not be saturated, and gas streams should be well below 100% humidity. The presence of an aqueous phase at any time during the treatment process will prevent formation of soft, easily removed salt deposits on the surface of the caustic particles, so only dry streams should be treated by this method.

Providing this constraint is observed, refiners have an efficient, low cost, and low waste method of removing acidic halides from dry gas streams, and regenerating caustic beds used to remove acidic halides from dry gas and dry liquid streams.

The process removes halides, but without the creation of additional amounts of hazardous waste which requires further treatment or expensive disposal. The only waste product that need be produced by my process is clean solid salt, which is low in volume. This is in contrast to conventional uses of caustic, which call for its dilution with water prior to use, so that a dilute brine solution is produced for disposal. My process is completely dry, and never goes through an aqueous phase.

I claim:

1. A process for removing acidic halides from a gas stream comprising:
   a. charging a gas containing less than about 2000 ppmv H$_2$O and from 1 to 4000 wt ppm acidic halide to a reactor;
   b. neutralizing said acid halides in said dry gas by contact and neutralization with particles of solid caustic containing at least a majority by weight solid caustic to produce salt;
   c. depositing at least a majority of said produced salt on said particles of solid caustic as dry salt crystals;
   d. removing from said reactor a dry gas having a reduced acidic halide content as a product of the process and e. at least periodically removing said deposited salt from said solid caustic to remove at least a majority of said salt deposits while leaving intact at least a majority by weight of said particle of solid caustic.

2. The process of claim 1 wherein said dry gas has less than 2000 wt ppm acidic halide content and less than 1000 ppmv water vapor.

3. The process of claim 1 wherein at least a majority of said acidic halides are chlorides.

4. The process of claim 1 wherein said bed of solid caustic is maintained as a fluidized bed.

5. The process of claim 1 wherein said bed of solid caustic is maintained as a fixed bed during salt deposition and a fluidized bed during salt attrition.

6. The process of claim 1 wherein said solid caustic is selected from the group of KOH, NaOH, and mixtures thereof.

7. The process of claim 1 wherein said caustic is essentially pure NaOH.

8. A process for removing chlorides from gas streams from a catalytic reformer comprising:
 a. charging a dry gas stream containing less than about 1000 ppmv $H_2O$ and from 1 to 2000 wt ppm chlorides from a platinum reformer to a neutralization reactor;
 b. neutralizing said chlorides in said dry gas by contact with particles of solid, essentially non-porous, caustic to produce salt;
 c. depositing at least 75% of said produced salt on a surface of said solid caustic as dry salt crystals;
 d. removing from said reactor a dry gas having a reduced acidic halide content as a product of the process; and
 e. regenerating said surface of said solid caustic by fluidizing said bed in an amount sufficient to cause particle to particle contact and attrit deposited salt from said solid caustic particles.

9. The process of claim 8 wherein said dry gas has less than 200 ppmv water vapor.

10. The process of claim 8 wherein said bed is a fixed bed, an ebulated bed or a moving bed.

11. A method of producing alkaline salt comprising:
 a. passing a fluid containing acidic contaminants comprising at least a majority by weight of halides and compounds thereof, said fluid being essentially free of any aqueous phase, through a bed of solid caustic particles;
 b. neutralizing said acidic contaminants by contact with said particles of solid caustic to produce salt;
 c. depositing at least 75% of said produced salt on a surface of said solid caustic as dry salt crystals;
 d. removing at least a majority of salt crystals from solid caustic by establishing constrained particle to particle contact of said solid caustic particles which attrits a majority of said salt from said surface of said solid caustic but leaves at least 90% of said solid caustic intact as solid particles to produce alkaline salt comprising a mixture of a majority by weight of salt crystals with a minor amount of attrited solid caustic as a product of the process.

12. A method of regenerating the surface of a salt contaminated solid caustic particles used to remove acidic halides from an aqueous phase free fluid comprising:
 a. fluidizing a bed of salt contaminated solid caustic particles in a flowing stream of fluid which essentially free of any aqueous phase;
 b. removing at least a majority of said salt contamination by attrition via particle to particle contact in said solid bed to attrit a majority of said salt from said surface of said solid caustic while maintaining the physical integrity of said solid caustic particles to produce particles with a reduced salt contaminant content as a product of the process.

13. A process for removing acidic halides from a gas stream at a temperature above the boiling point of water at the pressure of said gas stream comprising:
 a. charging said gas containing acidic halide to a reactor;
 b. neutralizing said acidic halides in said dry gas by contact and neutralization with particles of solid caustic containing at least a majority by weight solid caustic to produce salt;
 c. depositing at least a majority of said produced salt on said particles of solid caustic as dry salt crystals;
 d. removing from said reactor a dry gas having a reduced acidic halide content as a product of the process and
 e. at least periodically removing said deposited salt from said solid caustic to remove at least a majority of said salt deposits while leaving intact at least a majority by weight of said particle of solid caustic.

14. The process of claim 13 wherein said reactor contains a fluidized bed of essentially pure NaOH beads or pellets, said process operates at a temperature above 220° and below the melting point of NaOH, and salts are continuously deposited on said beads or pellets and continuously removed by attrition.

15. The process of claim 14 wherein cyclone separation is used to recover attrited salt as a product of the process.

* * * * *